(12) United States Patent
Peterson

(10) Patent No.: US 6,749,273 B1
(45) Date of Patent: Jun. 15, 2004

(54) TRAY SUPPORT SYSTEM FOR A BAG

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/393,284

(22) Filed: Mar. 20, 2003

Related U.S. Application Data

(63) Continuation-in-part of application No. 10/072,019, filed on Feb. 7, 2002, now Pat. No. 6,595,604.

(51) Int. Cl.[7] .................................................. E04H 1/14
(52) U.S. Cl. ............................... 312/3; 190/9; 190/110; 220/528
(58) Field of Search ........................ 312/3, 4, 236, 312/351; 190/9, 13 H, 33, 35, 110, 113; 220/558, 529, 528; 224/920; 206/561

(56) References Cited

U.S. PATENT DOCUMENTS

| | | | | | |
|---|---|---|---|---|---|
| 2,792,980 A | * | 5/1957 | Brown | ........................ | 224/633 |
| 3,186,529 A | * | 6/1965 | Gilbert | ........................ | 312/244 |
| 3,550,978 A | * | 12/1970 | Magee | ........................ | 312/108 |
| 3,759,356 A | * | 9/1973 | Bostick et al. | .............. | 190/111 |
| 4,093,041 A | * | 6/1978 | Davis et al. | ................... | 186/45 |
| 4,400,043 A | * | 8/1983 | Rossow | ....................... | 312/111 |
| 4,776,386 A | * | 10/1988 | Meier | ......................... | 165/48.1 |
| 4,993,558 A | * | 2/1991 | Assael | .......................... | 211/40 |
| 5,630,537 A | * | 5/1997 | Sciacca | ........................ | 224/629 |
| 5,988,476 A | * | 11/1999 | Olerio | .......................... | 224/630 |
| 6,213,268 B1 | * | 4/2001 | Dancyger | ................... | 190/110 |
| 6,435,390 B1 | * | 8/2002 | Abramowicz | ............... | 224/629 |

* cited by examiner

*Primary Examiner*—Korie Chan
(74) *Attorney, Agent, or Firm*—Sturm & Fix LLP

(57) ABSTRACT

A tray support system for a bag having an internal compartment with an access opening in the front wall. The tray support system includes a pair of opposing tray support brackets attached to opposing vertical side walls of the internal compartment. Each of the pair of brackets has a plurality of keyways that are horizontally aligned to form complementary keyways that receive keys carried on the side edges of removable spanners. Each spanner can support an individual tray and includes a recessed notch in its front edge to provide easy access to the tray. The tray support brackets are releasably attached directly to the side walls of the compartment. When the trays are not in use, the spanners may be removed making the space in the compartment substantially unobstructed and useable to store various items. Also, the brackets are easily and conveniently removably so that the bag may be folded for storage.

5 Claims, 2 Drawing Sheets

TRAY SUPPORT SYSTEM FOR A BAG

CROSS REFERENCE TO RELATED APPLICATION

This application is a continuation-in-part of U.S. patent application Ser. No. 10/072,019 filed Feb. 7, 2002 now U.S. Pat. No. 6,595,604 entitlied "Tray Support System for a Bag".

BACKGROUND OF THE INVENTION

1. Field of the Invention

The present invention relates to the field of bag accessories, and more particularly to a removable tray support system for a bag.

2. Description of Related Art

The prior art is replete with myriad and diverse tray support systems for bags, but none provide a system that can be broken down or removed to maximize the usable space when the trays are not in use.

While all of the aforementioned prior art constructions are more than adequate for the basic purpose and function for which they have been specifically designed, they are uniformly deficient with respect to their failure to provide a simple, efficient, and practical removable tray support system for a bag.

As a consequence of the foregoing situation, there has existed a longstanding need for a new and improved tray support system for a bag, and the provision of such a construction is a stated objective of the present invention.

BRIEF SUMMARY OF THE INVENTION

Briefly stated, the present invention provides a tray support system for a bag having an internal compartment with an access opening in the front wall. The tray support system includes a pair of opposing tray support brackets attached to opposing vertical side walls of the internal compartment. Each of the pair of brackets has a plurality of keyways that are horizontally aligned to form complementary keyways that receive keys carried on the side edges of removable spanners. Each spanner can support an individual tray and includes a recessed notch in its front edge to provide easy access to the tray. The tray support brackets are releasably attached directly to the side walls of the compartment. When the trays are not in use, the spanners may be removed making the space in the compartment substantially unobstructed and useable to store various items. Also, the brackets are easily and conveniently removably so that the bag may be folded for storage.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DESCRIPTION OF THE INVENTION

Figure 1:
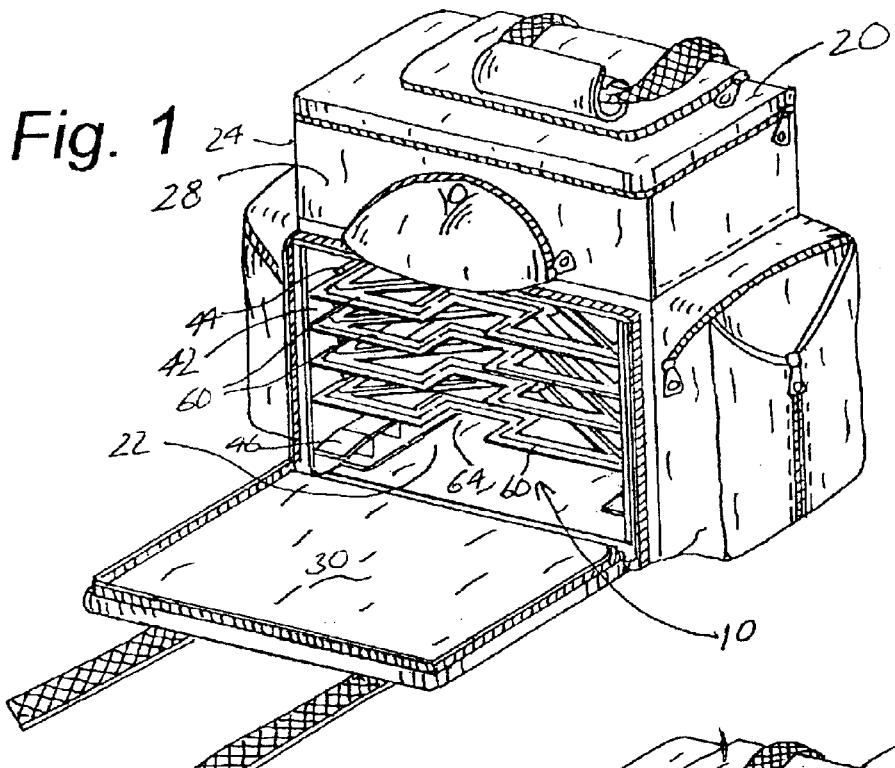
FIG. 1 is a perspective view showing the tray support system of the present invention.

As can be seen by reference to the drawings, and in particular to FIG. 1, the tray support system that forms the basis of the present invention is designated generally by the reference number 10.

The tray support system 10 is used in a bag 20 that has an internal compartment 22 defined by a pair of vertical side walls 24, a rear wall 26, a front wall 28, and a top wall 29 that interconnects the rear wall 26 and the front wall 28. The front wall 28 includes an access door 30 that is secured in a closed position by a zipper mechanism, and that is downwardly and outwardly pivotable to an open position shown in FIG. 1. It is to be understood that the access door 30 could also be designed to pivot upwardly or to the side.

Figure 3:
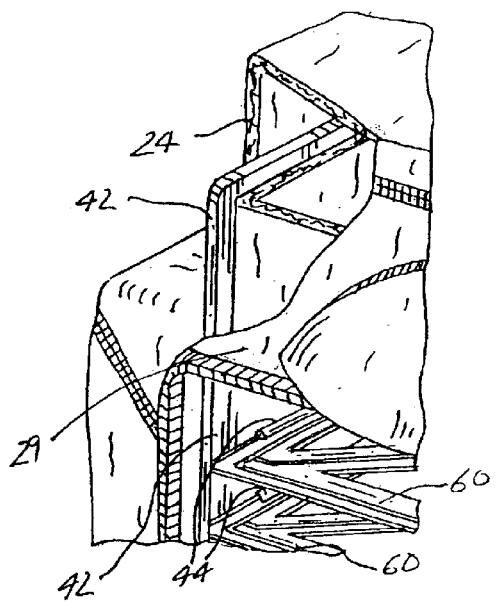
FIG. 3 is a partial perspective view showing one of the vertical side walls of the internal compartment extending above the top wall of the compartment.

A pair of tray support brackets 40 each include a back plate 42 and a number of keyways 44 that extend out from the back plate 42. The brackets 40 are directly attached to the side walls 24 since the back plate 42 extends up from and above the top wall 29 of the compartment 22 as shown in FIG. 3. The lowermost ledge 46 of the brackets 40 is spaced up form the bottom of the back plate 42 to provide clearance when the access door 30 is in the open position shown in FIG. 1. It is to be understood that this bottom spacing will not be required if the access door 30 is designed to open upwardly or to the side.

Figure 2:
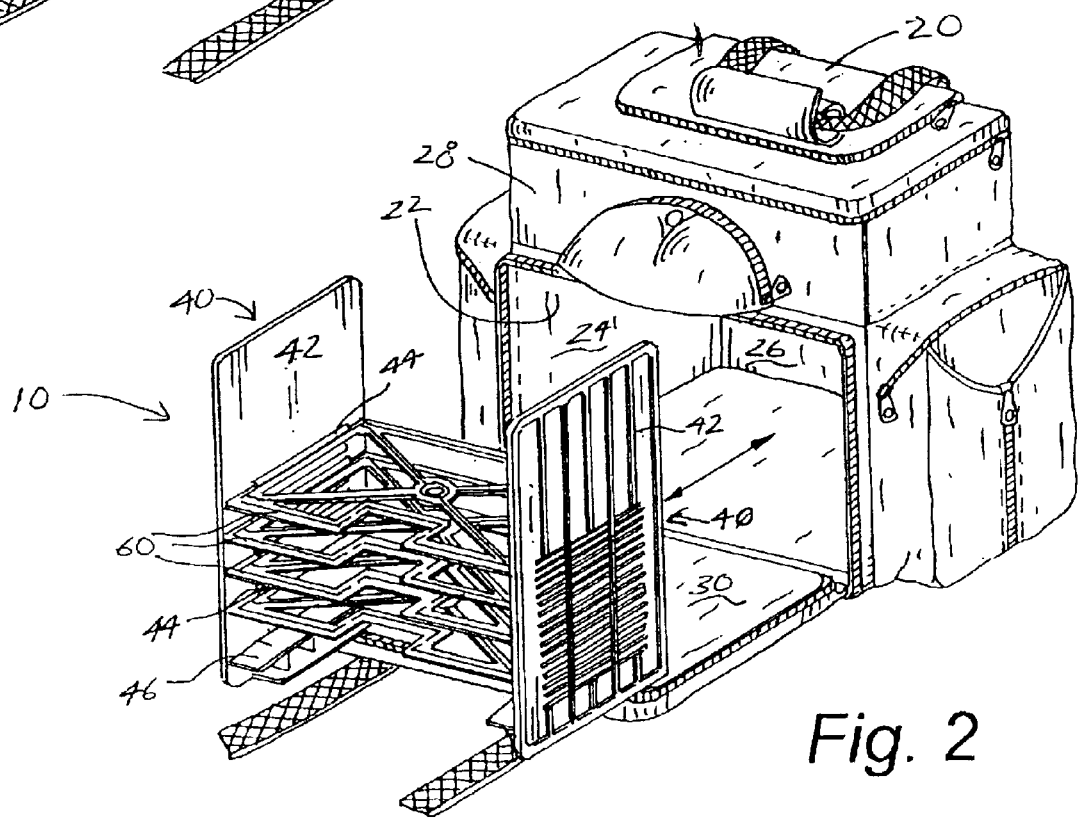
FIG. 2 is an exploded perspective view showing the brackets and associated spanners removed from the internal compartment of the bag.
Figure 4:
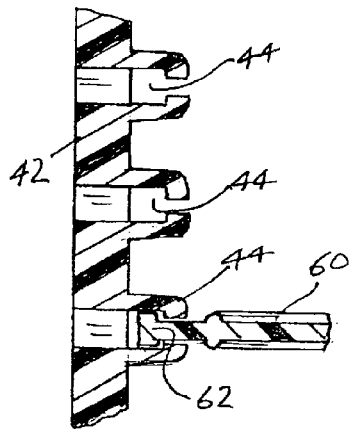
FIG. 4 is a partial sectional view showing the keyways in the tray support bracket and the key carried on one side edge of the spanner.
Figure 5:
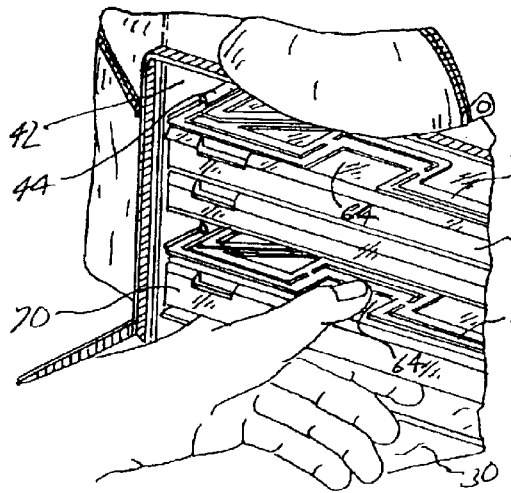
FIG. 5 is a partial perspective view illustrating a tray supported on a spanner.
Figure 6:
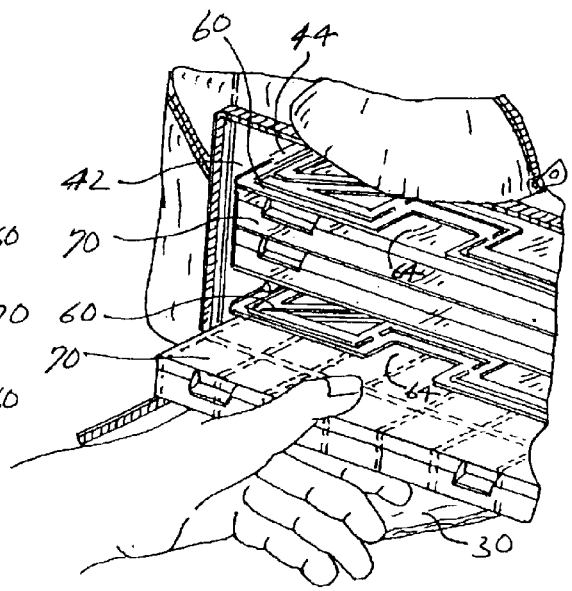
FIG. 6 is a partial perspective view similar to FIG. 5, but showing a tray in the process of being removed from the bag.

As shown in FIGS. 1, 2, and 4, the brackets 40 are installed in the compartment 22 so that the keyways 44 are horizontally aligned to form complementary pairs that receive keys 62 at the side edges of a spanner 60 which provides support for trays 70. The front edge of each spanner. 60 includes a recessed notch 64 to provide easy access to the trays 70 as shown in FIGS. 5 and 6.

It can be seen that the brackets 40 may be easily installed or removed as desired. When the trays 70 are not being used the space within the compartment 22 is substantially unobstructed and usable for storage of items of various sizes. Also, the bracket 40 may be removed so that the bag 20 may be folded for initial shipment to the customer, or for storage when not in use. When used with the trays 70, items such as fishing tackle, hardware, sewing supplies, or other small items may be conveniently carried.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A tray support system, comprising:

a bag having an internal compartment defined by a pair of vertically disposed horizontally spaced side walls, a vertically disposed rear wall interconnecting the sidewalls, a vertically disposed front wall horizontally spaced from the rear wall and including a selectively closeable access opening, and a horizontally disposed partial top wall interconnecting the rear wall and the front wall; wherein, the partial top wall has opposed edges that are spaced from said horizontally spaced side walls.

a pair of opposing tray support brackets, each bracket including a back plate, and a plurality of keyways extending out from the back plate, the back plate of each bracket being removably attached to one of the side walls such that the keyways of one of the pair of brackets are horizontally aligned with the keyways of the other of the pair of brackets to form a complementary pair of keyways wherein the vertically disposed side walls extend upwardly above the top wall and wherein each of the bracket back plates extends upwardly above the top wall.

a plurality of spanners each having side edges, a rear edge, and a front edge, wherein the side, edges each carry a key disposed to be matingly engaged and slideably received in the horizontally aligned complementary pair of keyways; and a plurality of trays each being disposed to be removably received on and supported by one of the spanners.

2. The tray support system of claim 1 wherein the access opening includes a panel that pivots downwardly and outwardly from the front wall to an open position, and wherein each of the brackets includes a lowermost keyway spaced above the panel when it is in the open position.

3. The tray support system of claim 2 wherein each of the spanners includes a recessed notch in the front edge whereby access to the tray is provided.

4. The tray support system of claim 1 wherein each of the spanners includes a recessed notch in the front edge whereby access to the tray is provided.

5. The tray support system of claim 1 wherein each of the spanners includes a recessed notch in the front edge whereby access to the tray is provided.

* * * * *